US012596728B2

(12) United States Patent
    Pinho et al.

(10) Patent No.:    US 12,596,728 B2
(45) Date of Patent:        Apr. 7, 2026

(54) PREDICTION OF TABLE COLUMN ITEMS IN UNSTRUCTURED DOCUMENTS USING A HYBRID MODEL

(71) Applicant: Dell Products L.P., Round Rock, TX (US)

(72) Inventors: Rômulo Teixeira de Abreu Pinho, Rio de Janeiro (BR); Paulo Abelha Ferreira, Rio de Janeiro (BR); Vinicius Michel Gottin, Rio de Janeiro (BR); Pablo Nascimento da Silva, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 1067 days.

(21) Appl. No.: 17/649,136

(22) Filed: Jan. 27, 2022

(65) Prior Publication Data

US 2023/0237080 A1     Jul. 27, 2023

(51) Int. Cl.
   *G06F 3/048*        (2013.01)
   *G06F 16/31*        (2019.01)
   *G06N 3/08*         (2023.01)

(52) U.S. Cl.
   CPC .......... *G06F 16/313* (2019.01); *G06F 16/316* (2019.01); *G06N 3/08* (2013.01)

(58) Field of Classification Search
   CPC ........ G06F 16/313; G06F 16/316; G06N 3/08
   See application file for complete search history.

(56) References Cited

U.S. PATENT DOCUMENTS

| | | | | |
|---|---|---|---|---|
| 11,321,559 B2 * | 5/2022 | Mehra | ................. | G06V 10/454 |
| 11,403,488 B2 * | 8/2022 | Tang | ........................ | G06N 7/01 |
| 11,782,928 B2 * | 10/2023 | Chan | .................... | G06F 40/177 |
| | | | | 707/769 |
| 12,190,618 B2 * | 1/2025 | Rodriguez | ........... | G06V 30/153 |
| 12,266,065 B1 * | 4/2025 | Kharbanda | ........... | G06T 19/006 |
| 12,306,862 B2 * | 5/2025 | Tong | .................... | G06V 30/413 |
| 2017/0293687 A1 * | 10/2017 | Kolotienko | ............. | G06F 40/30 |
| 2021/0406266 A1 * | 12/2021 | Chan | .................... | G06F 21/6245 |
| 2022/0108107 A1 * | 4/2022 | Sathi | .................... | G06V 30/413 |
| 2022/0405524 A1 * | 12/2022 | Yuan | .................... | G06N 3/0455 |
| 2023/0031202 A1 | 2/2023 | Ferreira et al. | | |
| 2023/0065915 A1 * | 3/2023 | Berestovsky | ...... | G06V 30/1448 |
| 2023/0237080 A1 * | 7/2023 | Pinho | .................... | G06V 30/412 |
| | | | | 706/16 |

(Continued)

*Primary Examiner* — David Phantana-angkool
(74) *Attorney, Agent, or Firm* — Workman Nydegger

(57) ABSTRACT

One example method includes collecting annotated unstructured documents that each include a table with words whose respective column indices are known, using the documents to train a model to detect a table header in a given document, identifying, by the model, a region of a document that corresponds to a table header in a new document that is not part of the training data, using an algorithm to perform a segmentation process on the table header that identifies column boundaries in the table header, and to use the identified column boundaries to preliminarily assign a respective column index to each word in the table header. Finally, a graph neural network model is run on a graph that includes the words in the table, and running the graph neural network generates a refined prediction of a respective column index for each of the words in the table of the new document.

20 Claims, 8 Drawing Sheets

300

ITEM OF INTEREST CANDIDATE
      KEYWORD ASSOCIATED WITH AN ITEM OF INTEREST
      GENERIC WORD

(56) References Cited

U.S. PATENT DOCUMENTS

| | | | |
|---|---|---|---|
| 2023/0237100 A1* | 7/2023 | Ferreira | G06V 10/82 |
| | | | 707/755 |
| 2023/0237272 A1 | 7/2023 | Teixeira De Abreu Pinho et al. | |
| 2023/0359661 A1* | 11/2023 | Ferreira | G06F 16/345 |
| 2023/0410543 A1* | 12/2023 | Chatzistamatiou | G06F 40/106 |
| 2024/0078382 A1* | 3/2024 | Gottin | G06F 40/226 |
| 2024/0104951 A1* | 3/2024 | Gu | G06V 30/19173 |
| 2024/0331431 A1* | 10/2024 | Berestovsky | G06V 30/414 |
| 2025/0046110 A1* | 2/2025 | Cordeiro | G06V 10/764 |

* cited by examiner

300

ITEM OF INTEREST CANDIDATE

KEYWORD ASSOCIATED WITH AN ITEM OF INTEREST

GENERIC WORD

350

```
GetColBoundaries(header_x0,              # X0 coordinate of the header region
                 header_words,           # Words and their bounding boxes
                 xspacing_tol,           # Acceptable inter-word spacing
                 min_xspacing,           # Minimum and max_xspacing,           # maximum x spacings between
                 wordsmin_num_pred_cols  # Minimum number of columns
                 ):
""" Obtain vertically agglutinated bounding boxes from header words """ bboxes =
    aglutinate_bboxes(header_words)

""" Collect the x differences between header words' bounding boxes,
    recording the minimum difference
    """ x_differences = []

min_xdiff = 0 for i in 1 to len(bboxes):

xdiff = bboxes[i].x0 - bboxes[i-1].x1
        x_differences.add( xdiff )

min_xdiff = max(min_xdiff, xdiff)

""" Find ideal xspacing for the current set of header words, ensuring it is within the
    min_xpacing to max_xspacing range """

xspacing = min_xdiff * xspacing_tol xspacing = min(max(xspacing, min_xspacing), max_spacing)

""" Find column boundaries according to computed agglutinated bounding boxes, x-
    differences and x-spacing, starting from top-left of tableheader region """

col_boundaries = [ header_x0 ]

for i, xd in enumerate(x_differences):if
        xd >= xspacing:

col_boundaries.append( bboxes[i+1].x0 )

""" Determine the number of columns based on the boundaries found """
    num_columns = len(col_boundaries)

if num_columns < min_num_pred_cols:

ERROR("Minimum number of columns not
    achieved") return col_boundaries
```

1002 — GENERATE TRAINING DATA

1004 — TRAIN COMPUTER-VISION MODEL

1006 — PRE-DETECT COLUMN ITEMS

1008 — REFINED COLUMN ASSIGNMENTS

1100

PREDICTION OF TABLE COLUMN ITEMS IN UNSTRUCTURED DOCUMENTS USING A HYBRID MODEL

RELATED APPLICATIONS

This application is related to: (1) U.S. patent application Ser. No. 17/586,494, entitled TABLE ROW PREDICTION USING MACHINE LEARNING; and (2) U.S. patent application Ser. No. 17/586,529, entitled TABLE COLUMN PREDICTION USING MACHINE LEARNING. All of the aforementioned applications, filed the same day herewith, are incorporated herein in their respective entireties by this reference.

FIELD OF THE INVENTION

Embodiments of the present invention generally relate to extraction of data and elements from unstructured documents. More particularly, at least some embodiments of the invention relate to systems, hardware, software, computer-readable media, and methods for detecting column items present in tables of unstructured documents.

The extraction of information from documents can improve data management techniques by allowing for automatic methods to understand, sort and process documents from different customers and documents pertaining to the internal processes of a company. Such companies may greatly benefit from having an automatic and low-cost method of classifying and extracting information from those documents for process automation or compliance purposes of internal and customer document data. However, significant challenges remain regarding some aspects of information extraction from documents.

One such challenge concerns automating the process of identifying column items from tables in unstructured documents using Machine Learning (ML). Particularly, an important aspect of document processing in an organization is the time and effort spent on reading and manually extracting information from documents. So, an automatic tool to extract content from documents without, or with minimal, human involvement could save a significant amount of working hours. Such a tool might also enable humans to work better and focus on more critical tasks. At present however, there are no satisfactory tools to fulfill these needs.

Another challenge relates particularly to tables in documents, specifically table layout variability, as table columns change in number, format, and location in the documents. Particularly, different documents and document types may have different pre-defined table layouts, even within the organization that produced the document. Table layouts may be similarly reused across different organizations. For example, every (Purchase Order) from company A has a layout A, with 3 columns, on the bottom of the page. In contrast, company B may generate documents, such as a PO, using the layout A and a layout B, with 6 columns, on the center of the document. In other words, a model to extract information automatically will have a hard time generalizing since strictly rule-based approaches are unlikely to work well with such variations in document configurations and layouts.

As a final example, documents with open-ended word content present a challenge to information extraction since it is not possible to know beforehand all the possible words that may be present in the document, such as in a table for example. Particularly, documents may have different pre-defined table layouts, and also have different words representing the table header and the content of the table. So, keywords cannot be directly used as anchors to discover the correct column of each word in the document.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3a discloses an example algorithm for identifying column boundaries in the header of a table.

DETAILED DESCRIPTION OF SOME EXAMPLE EMBODIMENTS

Figure 1:
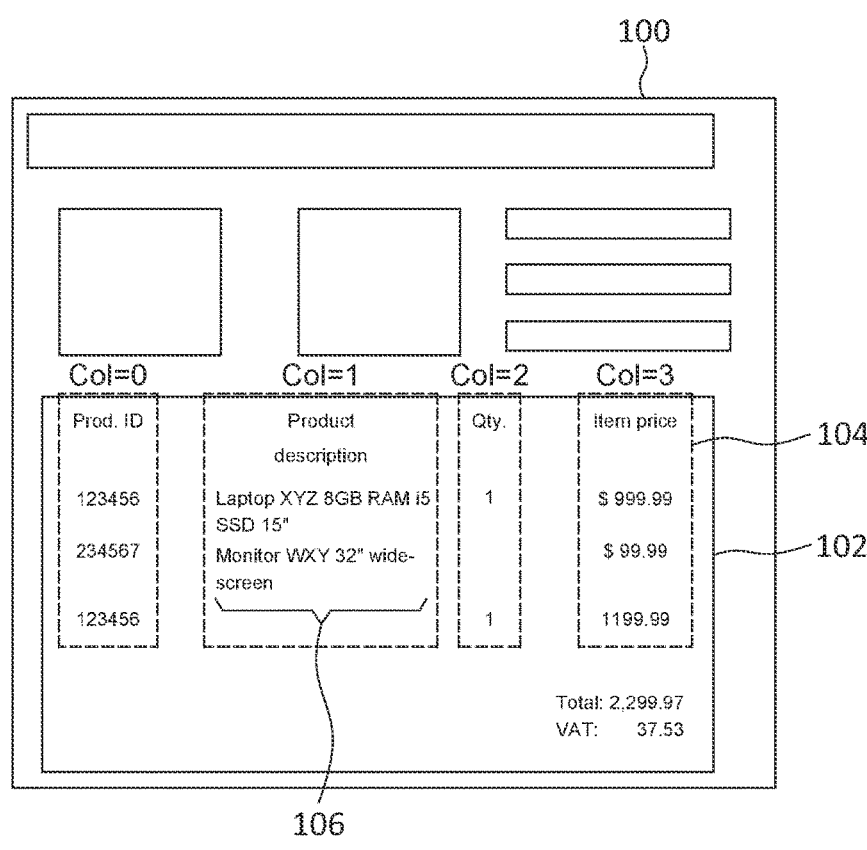
FIG. 1 discloses an example of an unstructured document.

Embodiments of the present invention generally relate to extraction of data and elements from unstructured documents. More particularly, at least some embodiments of the invention relate to systems, hardware, software, computer-readable media, and methods for detecting column items present in tables of unstructured documents.

In general, at least some example embodiments of the invention are directed to automatic methods for extracting column-items from tables in unstructured documents using a hybrid model. One example embodiment for extracting column-items may comprise four parts: (1) document data collection and annotation; (2) training/inference of a computer vision model to detect table body and table header boundaries; (3) application of a rule-based algorithm to pre-detect column-items; and (4) refinement using a Graph Neural Network (GNN) to finally assign a column to each element, or word, in the table. The machine learning operations may further comprise a training phase, and an inference phase.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may enable automatic, and reliable, identification of tables and table content in an unstructured document. An embodiment may provide faster information extraction from unstructured documents than would be possible with conventional approaches. An embodiment may help to reduce, or eliminate, human error that is typically introduced when information is extracted from documents by a human operator. Various other advantages of some example embodiments will be apparent from this disclosure.

It is noted that embodiments of the invention, whether claimed or not, H cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW

Digital transformation and AI (Artificial Intelligence) can greatly contribute to the area of data management. One important aspect of data management is document data management, where automatic digital processing can greatly improve efficiency and compliance. Many enterprises are developing AI methods for data management when processing internal and customer documents. The idea of information extraction from documents can improve data management techniques by allowing for automatic methods to understand, sort and process documents from different customers and documents pertaining to the internal processes of an enterprise. The enterprise would greatly benefit from having an automatic and low-cost method for obtaining this information to classify or extract content for process automation or compliance purposes of internal and customer document data.

Instances may arise where there is an interest in extracting information from unstructured documents with intrinsic layout information, for example, scanned documents, and text-based PDF documents (Portable Document Format). In one particular example, there is a need to be able to extract information from POs that are received by a vendor from various different customers. Extraction of this information may enable automation of at least part of an order booking process at the vendor. Another example application is an enterprise system that is required to correctly classify, label, and protect, data, documents, emails, and other information. These operations may be performed according to rules that are based on the origin, destination, purpose, and content of the information.

In both of the aforementioned examples, there is specific information which the enterprise is trying to extract from the documents. The PO use case may be of particular interest in some circumstances. For example, when a customer wants to buy products from a vendor, a PO document must be sent by the customer to the vendor with all information regarding the list of products the customer wants to buy, the delivery address, contact information, quote number, and other details. Then this document is read by an employee at the vendor, who manually checks if all the information is correct, which is time-consuming. Thus, example embodiments may operate to automatically identify and extract a set of fields from unstructured documents to extract and/or understand and classify relevant parts of its content.

Table extraction in unstructured documents, for instance, presents a difficult problem, involving pre-processing steps, computer vision and NLP (Natural Language Processing). However, most conventional approaches to this problem depend on strong assumptions on word features, pre-processing and post-processing. At present, no approach has combined, as disclosed herein, rule-based algorithms with GNNs in order to classify elements with their correct column of a table. As well, and in contrast with the disclosed embodiments, conventional approaches are unable to learn new template-based representations for positional field extraction automatically over time.

With the foregoing discussion in view, example embodiments may be directed to detection of column items present in tables of unstructured documents, an example of which is POs. As noted earlier, automatic table extraction in unstructured documents is a difficult problem. Identification of columns, in particular, is challenging because word locations have weak correlations with column indices due to the variable number and location of columns in document tables. For this reason, the identification of table columns is typically solved separately from the identification of table rows.

More particularly, some example embodiments may implement an automatic method for extracting column-items from tables in unstructured documents. One example embodiment is directed to a process that comprises three operations: (1) computer-vision deep neural network (DNN) model trained specifically for the detection of the region comprising a table body and table header; (2) a rule-based approach that assigns a prior column to each element, where an example of an element is a word that appears in a table, considering only the regions obtained in (1); and (3) a Graph Neural Network (GNN) model where the output from the rule-based approach enriches the graph and allows for more accurate predictions of the column index of each word in a table. Thus, at least some example embodiments are directed to a hybrid model that combines the rule-based algorithm with a GNN using only a pair of input features. Sample results from the application of an example embodiment to a large dataset of Purchase Orders are presented elsewhere in this disclosure.

With reference briefly to FIG. 1, an example unstructured document 100 is disclosed with which an example embodiment may be employed. The unstructured document 100 may be a purchase order, but the scope of the invention is not limited to use with any particular unstructured document, or type of unstructured document, nor to extraction of any particular content or type of content from a document. In the example of FIG. 1, the unstructured document 100 includes a table 102 with multiple columns 104. Each of the columns 104 includes content 106, such as words for example, that may be targeted for extraction by example embodiments of the invention.

Note that, as used herein, an 'unstructured document' embraces, for example, documents in which the locations of fields within the document, and/or the locations of content within those fields, may be unknown. An unstructured document may be created by a human, for use by a human. Contrast an unstructured document with a structured document, such as an .xml document for example, where the format and arrangement of the document follow specified structural rules. A structured document may be created by a machine, for use by a machine.

Among other things, example embodiments may be directed to assignment of the correct column 104 indices to content 106 inside the table 102. For example, given a document such as the unstructured document 100, an embodiment of the invention may determine that the content 'Monitor WXY 32" wide-screen' belongs in column 1 of the table 102, while the content '$99.99' belongs in column 3 of table 102.

B. ASPECTS OF SOME EXAMPLE EMBODIMENTS

In general, some example embodiments may assume that a document, such as an unstructured document for example, can be pre-processed by generating a list of words and the coordinates of their corresponding bounding boxes within the document. This task may be executed using, for example, Optical Character Recognition (OCR) if the document is in the form of one or more scanned images. There are various commercial and open-source OCR tools available for this purpose, one example of which is Tesseract. Alternatively, a document in digital form, such as the .PDF format for example, may already contain the required information in the desired format. Open-source programming libraries and frameworks exist that support the extraction of words and graphical elements from such documents, such as 'pdfplumber' for the Python programming language.

As well, object detection using machine learning processes has been successfully applied in the field of object detection, especially with the advent of Deep Learning (DL) and large-scale image datasets. An example of such object detection is detecting faces on camera images, as used by most commercially available phones when taking pictures. A great deal of the success in this area is due to supervised learning, where a set of known examples is given to a DL model during the training phase. The model can be trained to output detections that are close to the correct ones through adjustment based on one or more error metrics. Once the model has been trained, one can use it for inference, where objects can be detected in images previously unseen by the model.

As disclosed herein, example embodiments may employ Graph Neural Networks (GNN). In general, a GNN may comprise a machine learning model that takes as input a graph $\Gamma=(N, E)$ represented by a set of nodes, N, connected by edges, E. In a typical GNN implementation, features H associated with the graph nodes at eachlayer, l, of the network may be transformed via a function of the features of the neighboring nodes and edges in the graph in the previous layer.

That is, $h_{i,l+1}=f(h_{j,l}, e_{j,i,l} \forall j \in \mathcal{N}(i))$, where $h_{i,l+1}$ are the features of node i at layer l+1, $h_{j,l}$ are the node features of the neighbors of node i at layer l, $e_{j,i,l}$ are the features of all incident edges of node i at layer l, and $\mathcal{N}(i)$ are the neighbors of node i. These successive transformations through multiple network layers may generate an embedding of the features of the nodes, which can then be used as input for classification or regression models.

Figure 2:
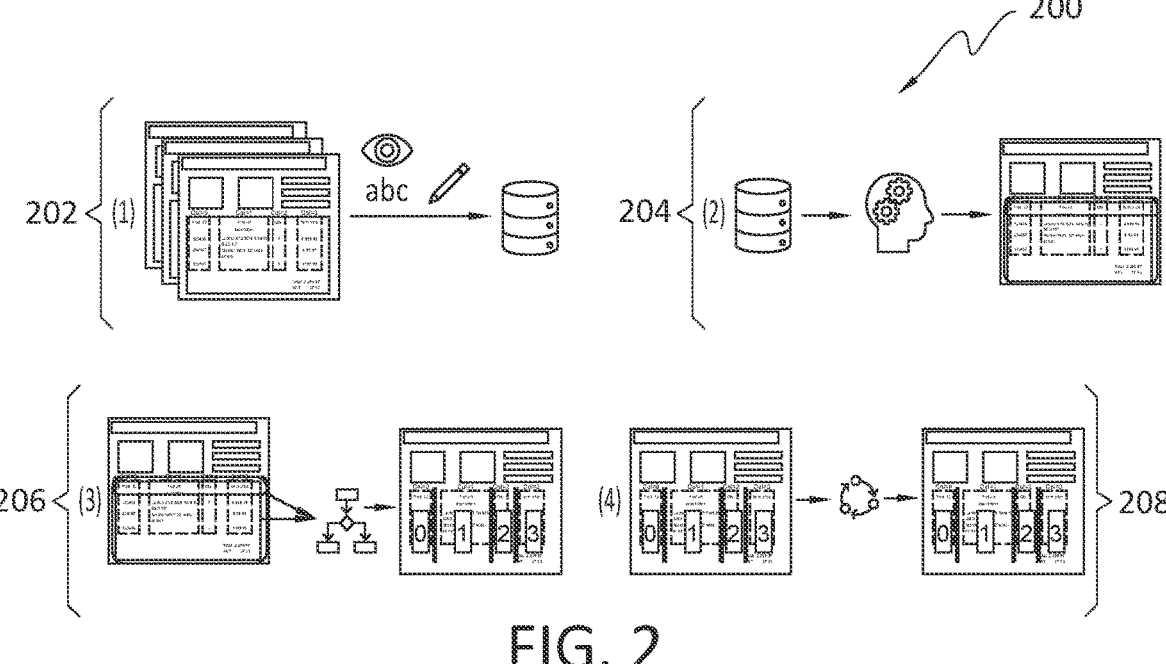
FIG. 2 discloses an overview of an example method according to some embodiments.

With reference now to FIG. 2, a high level overview of an example method 200 according to some embodiments is disclosed. As disclosed there, the method 200 may begin with document data collection and annotation 202. The next part of the method 200 may comprise training/inference 204 of a computer vision model to detect table body and table header boundaries. A computer vision model may comprise any computer-implemented model that is able to operate on media, such as document images for example, to detect one or more aspects of the document. A rule-based algorithm may then be applied 206 to pre-detect one or more column elements, that is, content contained in a column, in the document. Finally, a refinement may be performed 208, using a GNN for example, that makes a final assignment of a column to each element, such as a word for example, in the table.

B.1 Data Collection and Annotation

For the purposes of some embodiments at least, it may be assumed that the documents to be processed are in either a PDF format, or a scanned image format, from which words and their bounding boxes can be extracted. It may further be assumed, for some embodiments at least, that labeled, or annotated, data is available for machine learning model training purposes. In some embodiments, annotations may comprise indications as to the true column index of each word in a document table. By way of illustration, an annotation may indicate, for example, that the word(s) in a shipping address are located in column 2 of a table, where column 2 may have a 'shipping address' header.

Annotations to data may be made by a human and/or by a machine. Thus, annotated data may comprise, for example, machine labeled data and/or data annotated by humans using annotation tools. Annotated data may also be obtained from the usage of document processing software where one could possibly match documents that have been previously processed with their processed information. More generally then, as used herein, 'annotated data' is intended to be broad in scope and is not limited to any particular type of annotation, nor is limited to annotation by any particular entity or type of entity.

Finally, the set of documents for which the field information is known may be referred to herein as comprising the annotated documents. The annotation process may also involve processing the database of documents with a word extractor, such as an OCR or a PDF reading tool for example, that that obtains words and their positions in a digitized document.

B.2 Table Detection

Figure 3:
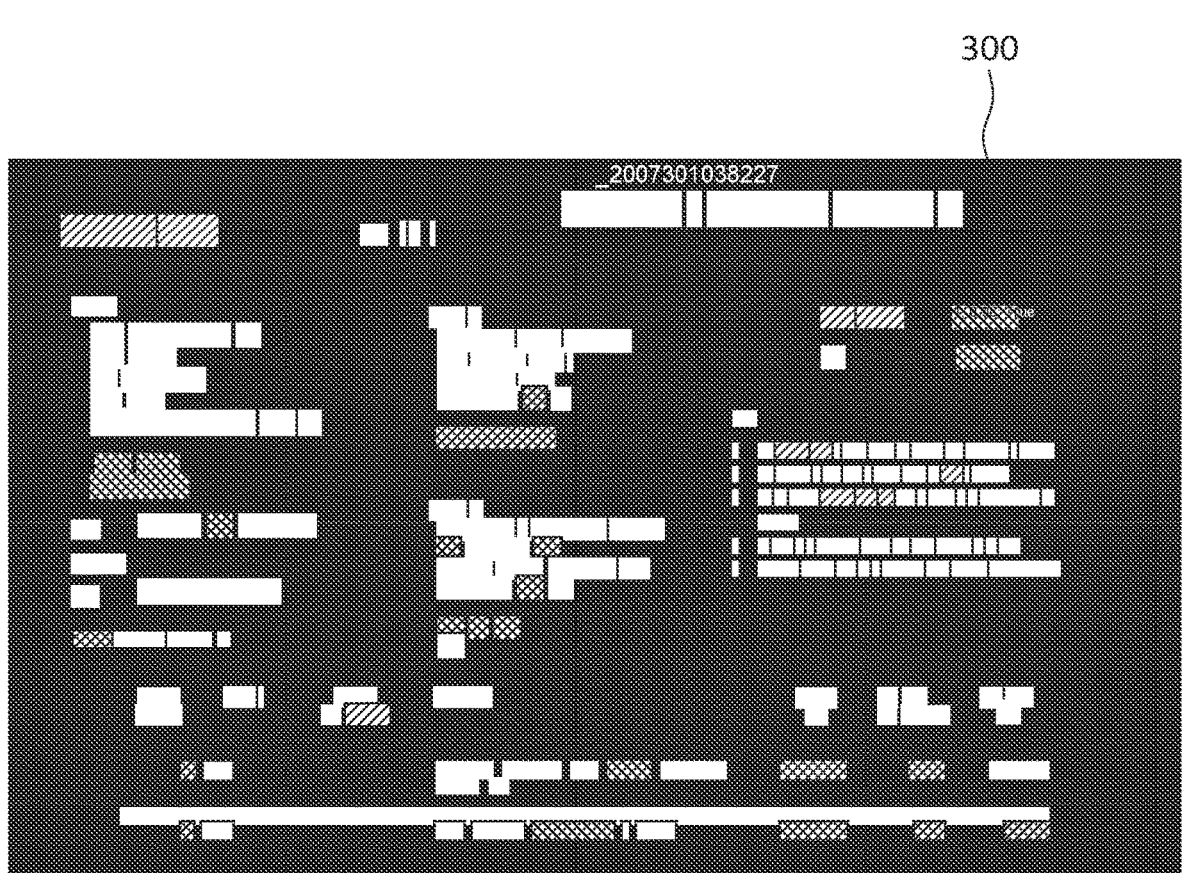
FIG. 3 discloses an example purchase order that has been subjected to a coding process that identifies items of interest, keywords, and generic words.

With reference now to FIG. 3, the table detection process 204 may comprise detecting a table body and a table header on a given document 300. To do this, embodiments may provide for training a computer vision (CV) model. In an example training process for a CV model, an object detection DNN (Deep Neural Network) may receive an image mask configured so that the bounding boxes of keywords associated with an item of interest, such as an 'order number' field, in the document, and candidates for the item of interest itself, are color-coded while the bounding boxes of generic words, that is, words that are not considered items of interest, are colored white. In this approach, the CV model may infer the location of the bounding box of the item of interest by learning the geometrical, or layout, relationships between keywords and generic words, as disclosed in the example of FIG. 3.

In particular, the document 300 disclosed in FIG. 3 comprises an example of a PO document that was subjected to the aforementioned color-coding process. Note however, that rather than using colors in FIG. 3, various different gray-scale shades have been used to distinguish items of interest, such as an 'order number' for example, keywords associated with an item of interest, and generic words.

Example embodiments of the invention may operate to train two models for the table detection, both of which may comprise CV models. The first model may be used for detection of the table body, and the second model may be used for detection of the table header since, while the table header may include text, there may be a need H to distinguish the text in the header from the text included in the table columns. In addition, only keywords are color-coded, or otherwise distinguished, since the aim of some embodiments may be simply to detect regions, and not specific items, within the document. As disclosed elsewhere herein, these two models may be useful in the assignment of row indices to table words because (1) embodiments may filter out words that are not inside the table, and (2) differentiations between body and header words may serve as input features for the subsequent modelling techniques of some embodiments.

To train the CV models just referred to, a set of annotated data may be employed. This set of annotated data may be referred to herein simply as 'training data.' That is, a supervised learning process may be performed for these models in which the input, that is, the annotated data, is an unstructured document and the output of each model is a bounding box corresponding to an estimation, by the model, of the correct boundaries of a table body or a table header contained in the training data. Note that, given the problem domain to which some example embodiments may be directed, it may be assumed that all documents used for training the models have a table with a list of items, and it may further be assumed that the data is annotated accordingly.

At inference time, that is, after the models have been trained with the training data, one or both of the models may then receive one or more unlabeled, that is, unannotated, and unstructured, documents, and the model(s) may then predict, based on their training, a bounding box with an associated confidence score. That is, the models may make an assessment as to one or more of the existence, size, and layout, of a bounding box within the unlabeled document. The confidence score may reflect an extent to which the model assesses that the predicted bounding box matches, in one or more respects, an actual table, table body, or table header, in the document. That is, a bounding box may comprise, for example, a table, a table body, or a table header. The predicted bounding boxes may then be mapped back to the unlabeled document(s) that was received by the model(s) as input, and may thus enable identification of all the words, if any, that are inside the predicted bounding box. In this way, a data structure may be defined that indicates, for each document, if a word is inside or outside the table body, table header, or other bounding box. The mapping of the predicted bounding box to the unlabeled document may also indicate how closely the bounding box prediction made by the model matches up with the actual location of the bounding box in the unlabeled document that was received by the trained model as input. If the mapping is not within, for example, a specified tolerance, the model may require further training.

B.3 Rule-Based Pre-Assignment of Table Columns to Table Content

An example rule-based algorithm according to some embodiments of the invention may be divided into two parts: (1) header segmentation; and (2) column indices assignment.

B.3.1 Header Segmentation

The first part of the rule-based approach is to segment the words inside the region defined by the table header in such a way as to find table column boundaries across the X-axis of the documents. This approach may be effective because header words typically define columns of a table. Column boundaries may be determined using various approaches. FIG. 3a discloses an example algorithm 350 that may be used for this purpose. In brief, the algorithm GetColBoundaries may operate to obtain a list of column boundaries based on the coordinates of the bounding boxes of words inside the header region. More specifically, the example algorithm 350 assumes that a table header exists in the document under consideration, and also assumes that a region corresponding to the table header has been found by a CV model, examples of which are disclosed herein, or any other table region detection method or model.

The algorithm 350 may receive, as inputs (see FIG. 4): (1) a coordinate of, for example, the (top) left of that header region; and (2) the list of words inside the header region, implicitly containing the coordinates of their bounding boxes. Bounding boxes may be defined by their left (x0), top (y0), right (x1) and bottom (y1) corners, and the algorithm 350 may assume that words are sorted by their x0 coordinate, that is, from left to right. This is indicated in the example document table 400 disclosed in FIG. 4 which discloses an example of input to a GenColBoundaries algorithm in a document, including the top left coordinate 'header_x0' of the header region and the set of header words and their respective bounding boxes. By way of example, the particular bounding box 404 of header word "Qty." is highlighted in FIG. 4 to show its respective coordinates.

One focus of the algorithm 350 is to handle the variability in the number of columns, the number of words per column, and the spacing between those words. To address this variability, the algorithm 350 may also receive, as inputs, one or more spacing parameters that provide the conditions to decide when words near each other should be considered as part of the same column.

Figure 4:
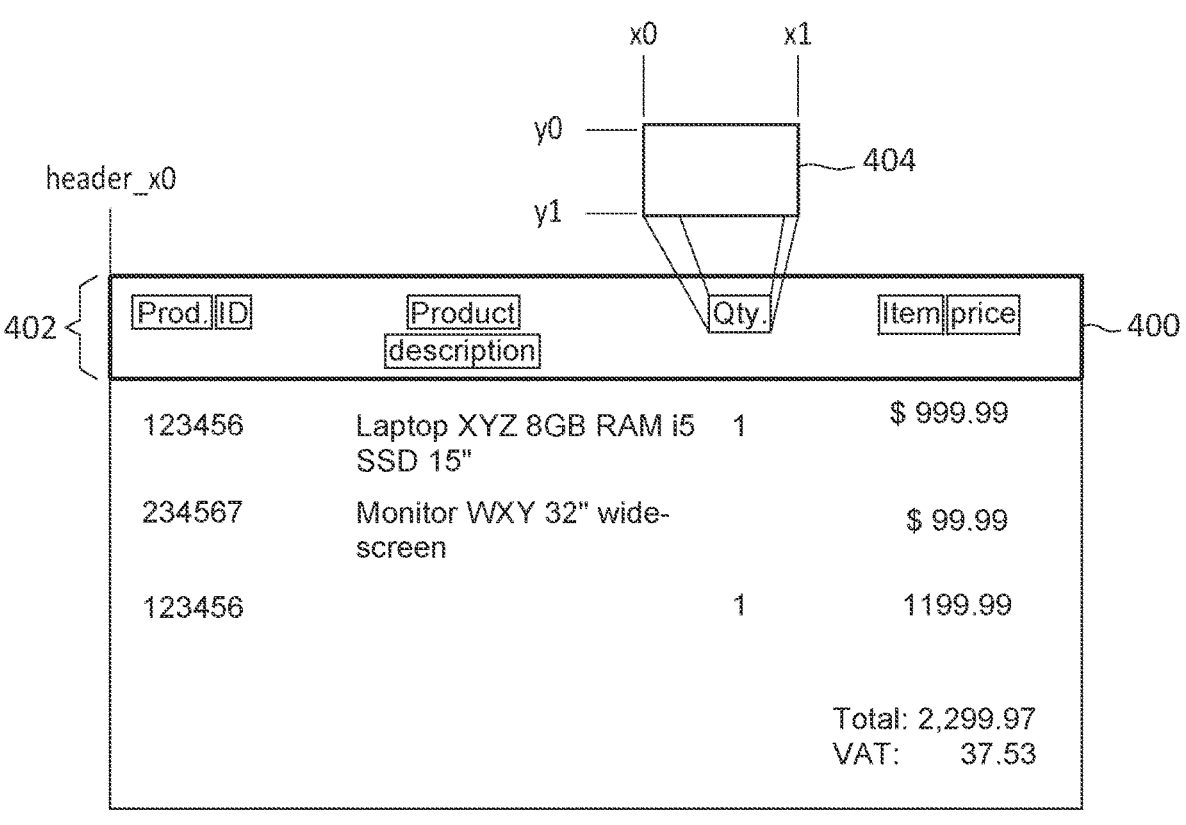
FIG. 4 discloses an example of input to an embodiment of a GenColBoundaries algorithm according to some example embodiments.

With continued reference to FIG. 4, the example algorithm 350 may comprise five parts. These are annotated by comments in FIG. 4.

Figure 5:
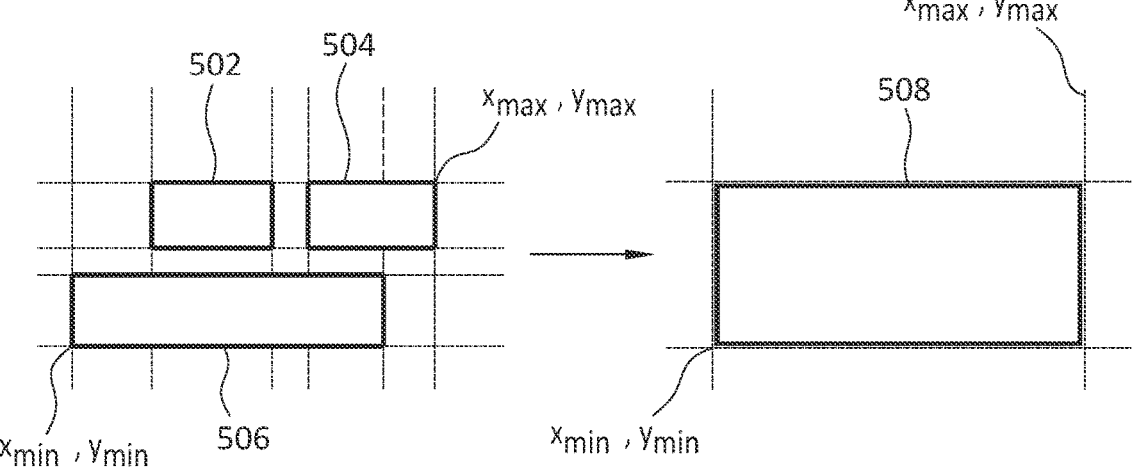
FIG. 5 discloses an example visual representation of an auxiliary agglutinate_bboxes algorithm according to some example embodiments.

Algorithm—Part 1. In the first part of the algorithm 350, the algorithm 350 may obtain the bounding boxes of the header words via a function agglutinate_bboxes. This function deals with multi-line headers by vertically merging bounding boxes, at different heights, that intersect across the x-axis of the header. For each set of header words whose bounding boxes intersect along the x-axis, a single resulting bounding box may be generated, whose extent is defined by the minimum x0, y0, $(X_{min}, Y_{min})$ and maximum x1, y1 $(X_{max}, Y_{max})$ coordinates among all those bounding boxes. A representation of this concept is shown in FIG. 5 which discloses a visual representation of the auxiliary aggluti-nate_bboxes algorithm, where bounding boxes 502 and 504 intersect, or overlap, along the x-axis, with bounding box 506, to define a single bounding box 508.

Figure 6:
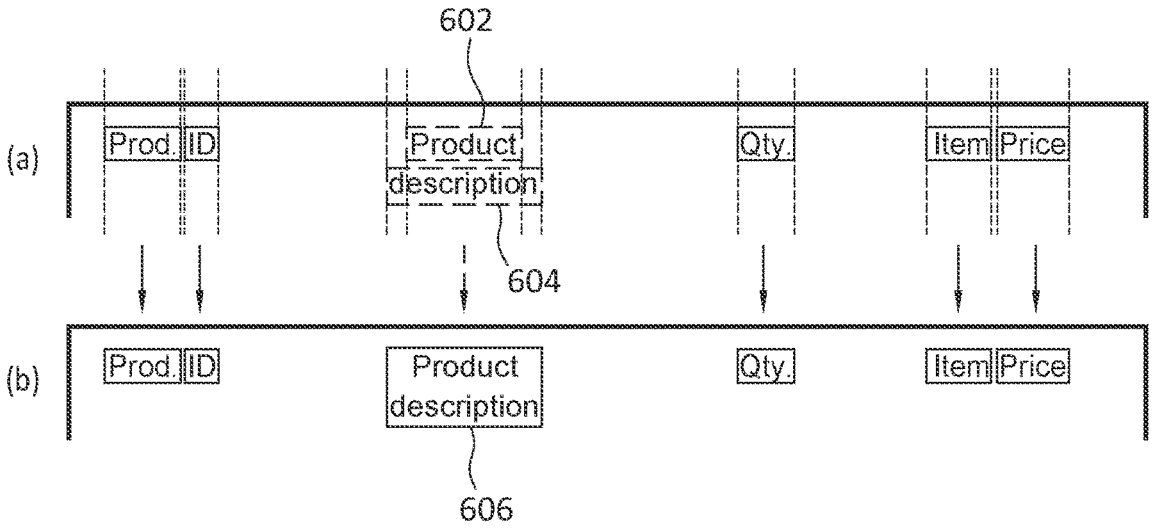
FIG. 6 discloses an example of the input to, and output of, an auxiliary agglutinate_bboxes algorithm according to some example embodiments.

With reference now to FIG. 6, an example of the algorithm 350 applied to the example of FIG. 4 is shown. That is, FIG. 6 discloses an example of the input (a), and corresponding output (b), of auxiliary agglutinate_bboxes algorithm applied to the example document table 400. In FIG. 6, the bounding boxes 602 and 604 overlap along the X-axis. The algorithm then uses the minimum x0, y0, and maximum x1, y1 coordinates among those bounding boxes 602 and 604 to define a single bounding box 606 that merges the words of the bounding box 602 and the bounding box 604 together.

Figure 7:
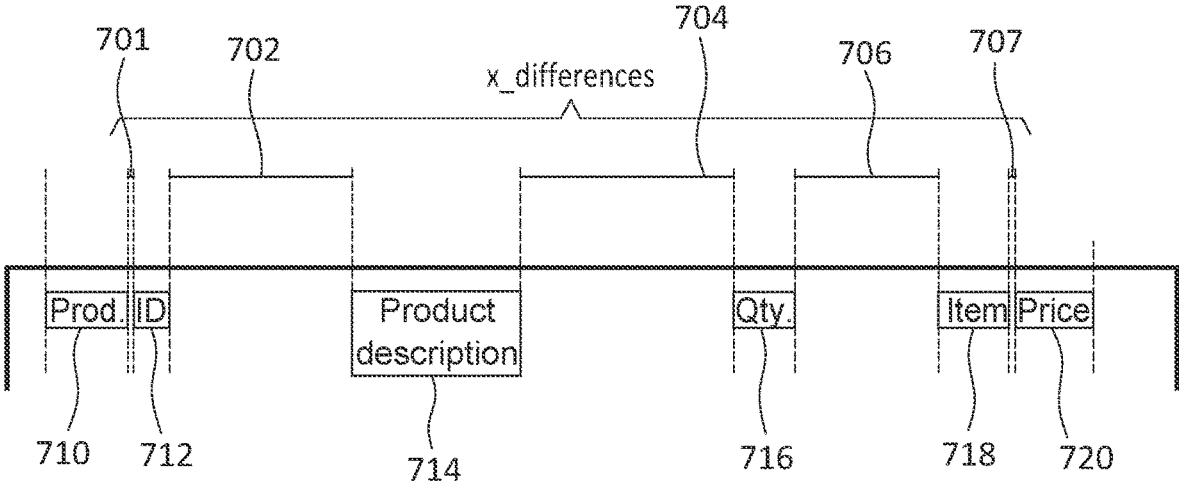
FIG. 7 discloses the x_differences found by an example embodiment between the bounding boxes.

Algorithm—Part 2. The second part of the GenColBoundaries algorithm may compute and collect the difference between the leftmost coordinate (x0) of a merged box and the rightmost coordinate (x1) of the previous one. This reflects the spacing between merged boxes across the X-axis of the table header. The minimum such difference may be recorded. This is shown in FIG. 7, which discloses the x_differences 701, 702, 704, 706, and 707, found between respective pairs of bounding boxes, specifically, between bounding boxes 710 and 712 (701 x_difference), 712 and 714 (x_difference 702), 714 and 716 (x_difference 704), 716 and 718 (x_difference 706), and 718 and 720 (x_difference 707).

Algorithm—Part 3. The third part of the algorithm 350 may find the xspacing, that is, the allowed inter-word x-spacing to determine if a column boundary exists or not between two consecutive boxes, using the minimum found difference and the tolerance parameters of the function. By computing an xspacing threshold for each header, the algorithm 359 may be adaptable to different header layouts.

Figure 8:
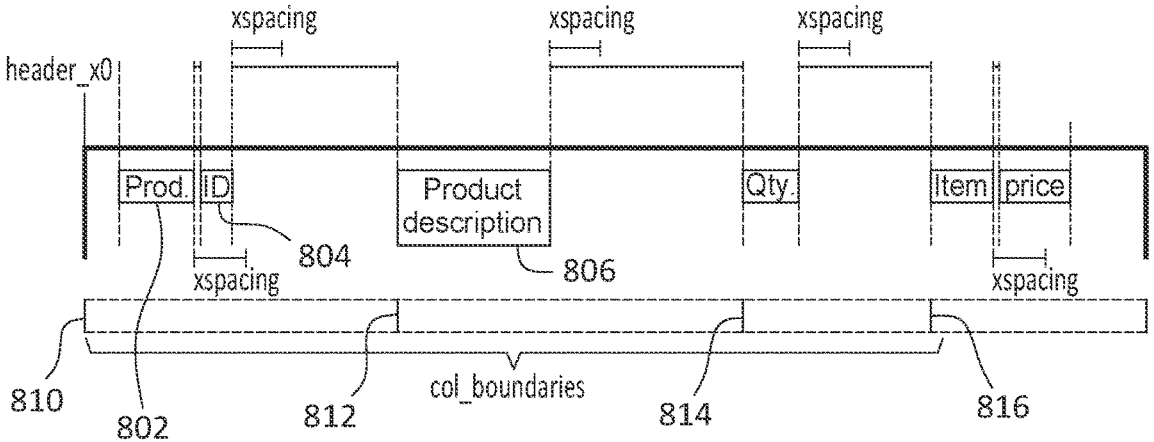
FIG. 8 discloses resulting col_boundaries from the comparison of each x_difference to the xspacing, according to some example embodiments.

To illustrate, with respect to bounding boxes 802, 804, and 806, FIG. 8, a defined value for xspacing may be greater than the x-axis spacing between the maximum x value (far right) for bounding box 802 and the minimum x value (far left) for bounding box 804. Because the x-axis spacing between the bounding boxes 802 and 804 is less than the threshold value for determining that two bounding boxes should be separate, that is, the xspacing value, the algorithm 350 may deem that bounding boxes 802 and 804 should be combined.

Algorithm—Part 4. The fourth part of the example algorithm 350 may compute and identify column boundaries by checking whether the spacing between subsequent merged boxes exceeds the threshold xspacing computed as indicated above. Column boundaries may be added to a list, starting with the leftmost coordinate of the header region, which may be an input to the algorithm 350. With particular reference to the example of FIG. 8, the defined value for xspacing may be less than the x-axis spacing between the maximum x value (far right) for bounding box 804 and the minimum x value (far left) for bounding box 806. Because the x-axis spacing between the bounding boxes 804 and 806 exceeds the threshold value, that is, the xspacing value, for determining that two bounding boxes should be combined, the algorithm 350 may deem that bounding boxes 804 and 806 should be separate from each other.

Algorithm—Part 5. Finally, in the fifth and last part of the example algorithm 350, the algorithm may verify whether the list of column boundaries 810, 812, 814, and 816, does not reach the specified minimum number of columns to be found. In that case, the algorithm may generate an error. Otherwise, the algorithm may return the list of column boundaries found, that is, a list of leftmost edges (along the x-axis) of the columns. As shown in FIG. 8, the column boundaries may be found by the comparison of each x_difference to the xspacing determined earlier by the algorithm 350. That is, where an x_difference exceeds an xspacing, a determination may be made that a left boundary of a column exists at the far right edge of the x_difference.

B.3.2 Column Indices Assignment

Figure 9:
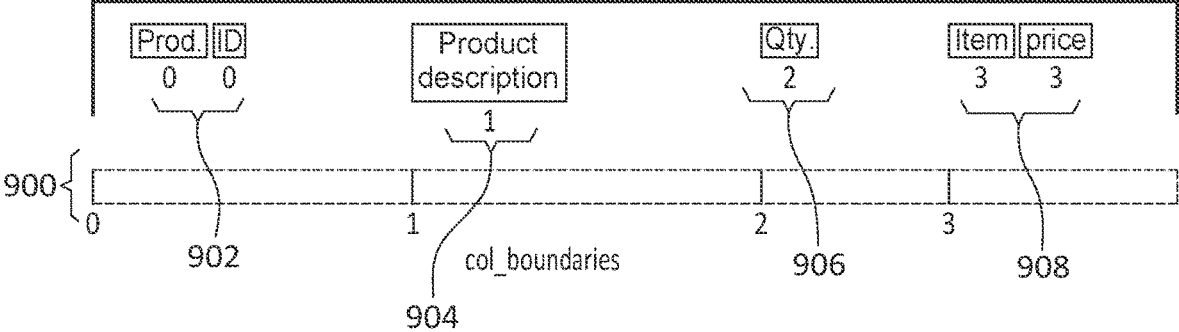
FIG. 9 discloses the assigning of column indices to words based on the col_boundaries, according to some example embodiments.

The second part of the example rule-based algorithm disclosed herein is a function that traverses the list of column boundaries and the list of header words to assign column indices to words in a table. This may be done by identifying words located in-between boundaries and assigning the respective column boundary index to those words. This is shown in FIG. 9, which discloses the assigning of respective column 900 indices 902, 904, 906, and 908, to words based on the col_boundaries that were defined earlier by the example algorithm 350. Thus, for example, column index 0 may be assigned to the words 'Prod.' and 'ID' as shown in FIG. 9. As an output, the rule-based algorithm may return the list of headers and their respective column indices, which may be used as input to a Graph Neural Network (GNN), in the next part of an example method. In the example of FIG. 9, this list would be as follows:

Prod.ID—column index=0;
Product description—column index=1;
Qty.—column index=2; and
Item price—column index=3.

B.4 Graph Neural Network Model

Some example embodiments may use a GNN model to learn the column indices of each word inside a table of an unstructured document. In the following subsections, examples of a training stage and an inference stage of a GNN model are presented that may be employed in some embodiments.

B.4.1 Training of the GNN

The table region may be considered as the union of the table body and the header, as determined by CV model discussed herein. Therefore, the input data for the GNN model may comprise, for example, a fully connected graph whose nodes each correspond to a respective word inside the detected table region. Each of the nodes may be considered to have one or more features, and the features for a node may be combined with each other, such as by concatenation for example, to define a feature vector 'x' for that node. Some example embodiments may employ the following features for one or more nodes:

(1) the x coordinate of the top-left corner of the bounding box of each word, which provides a notion of layout of the table; and (2) the column index, obtained via the rule-based algorithm, which provides a "first guess" of the column index that is intended to be predicted with the model.

It was noted earlier that each node of a graph according to some embodiments may correspond to a respective word of a table, and various features, also referred to herein as 'node features,' may be defined for each of such nodes. In addition, one or more edges may be defined that each associate two nodes with each other in some way. Correspondingly, one or more edge features may be defined for each of such edges. As edge features, example embodiments may concatenate two values into a single edge feature vector, namely, the (dx, dy) differences in position between the two words, or nodes, sharing the edge, which also provides a notion of the layout of the table. The output of the GNN model then may be a list of real numbers greater or equal to 0, one number for each input word (node). By having this flexible output, embodiments may have an unbounded prediction on the column assignment (starting at 0).

To train the GNN model, embodiments may employ annotated data where the column index of each word, that is, the target variable, y, is known a priori. That is, the column indices may be known simply based on logic, rather than based on empirical evidence, experience, or observation. The column indices may be used as labels in a supervised learning procedure, where the aim is to learn the parameters, $\theta$, of a function $y=f(x|\theta)$ that minimizes the error between the predicted values $\hat{y}$ and the true values y. In effect, the prediction error may be one of the elements in the learning process. In general, example embodiments may employ any domain-appropriate error function. Some particular example embodiments may operate to combine two different error functions. An example of this approach is disclosed in the Related Applications, and set forth below:

$$\varepsilon(y,\hat{y})=L_1(y,\hat{y})+\text{ColSortErr}(y,\hat{y})$$

The function:

$$L_1(y,\hat{y})=|y-\hat{y}|$$

may be the traditional L1 norm used in many settings. In the function:

$$\text{ColSortErr}(y,\bar{y})$$

embodiments may employ prior knowledge about the structure of a table. If words in a table are sorted by their respective 'y' coordinate, it may be expected, in some embodiments at least, that words of the first column will be the first, followed by the words on the second column, followed by the words on the third column, and so on. Numerically, column indices of the sorted words may appear as a sequence, such as:

S=000 . . . 00001111 . . . 111122 . . . 222 . . . .

where each digit 0, 1, and 2, identifies the column in which a corresponding word appears. If a new sequence, S', is generated by taking the absolute difference between an element, or word, and the previous one, that is, whether or not there was a change between the column index of a word and the column index of the word immediately preceding that word, referred to here as $\delta(S)$, each column transition will be marked with a 1 and all other elements will be 0, as follows:

S'=000 . . . 00001000 . . . 000010 . . . 000 . . . .

The sum of the elements of the sequence should be the total number of columns in the table minus one, since the first column of the table starts at x=0 rather than at a transition 1. In a perfect prediction of the model, such sum for the sorted sequences of y and $\hat{y}$ should be equal. Therefore, the function:

$$\text{ColSortErr}(y,\bar{y})$$

may be defined as:

$$\text{ColSortErr}(y,\hat{y})=|\text{sum}(\delta(\text{sort\_colwise}(y)))-\text{sum}(\delta(\text{sort\_colwise}(\hat{y})))|$$

Note that, at training time, all column indices used as targets refer to words inside the ground truth tables, that is, the tables that make up part of the annotated data used to train the models, and not to words inside the table regions predicted with the CV model. Similarly, the first guess of the column indices obtained with the rule-based algorithm and used as input for the GNN model may also be computed considering the ground truth table regions. This may enable the model to learn the true word locations in the training dataset and how those word locations relate to column indices. As discussed below, some embodiments may only use the predicted regions at inference time, since the ground truth is not available and may only be employed for training purposes.

B.4.2 Inference

At inference time, embodiments may predict the column index of a new non-annotated document, which was not part of the training set. One example method may comprise the following operations:

(1) Process the document to obtain its list of words and their locations;

(2) Generate the image masks that will be provided as input to the trained computer-vision model;

(3) Run the computer-vision model, which will predict the bounding boxes of the table header and of the table body;

(4) Filter out the words that are located outside the predicted table regions;

(5) Run the rule-based algorithm on the words inside the table to obtain a first guess at to the column index of each word in the table;

(6) Build a fully connected graph from the words of the table and assemble the node and edge feature vectors of the graph; and (7) Run the GNN model on the graph and obtain a refined prediction of the columnindex of each word in the table.

Once this inference method has been performed, information may be extracted from the table and processed, for example, based on the table column from which that information was extracted. As a simple illustration, all of the words in the 'Item Price' column may be extracted and summed to provide a total cost of goods listed in a purchase order.

C. FURTHER DISCUSSION

Example embodiments disclosed herein may possess a variety of useful features and aspects, examples of which are discussed below. This discussion is not intended to limit the scope of the invention in any way.

One example of such a feature is the use of a rule-based algorithm for column index identification based on the location of words in the table header. Particularly, example embodiments may employ a rule-based algorithm for identifying column indices of each word in a table of an unstructured document. Such algorithms may be based on the observation that words in the table header typically define the boundaries of each column.

As another example, embodiments may combine a rule-based approach with state-of-the-art Machine Learning for column index identification in unstructured documents. In contrast with conventional approaches, embodiments may employ a rule-based algorithm, based on table header columns, that is combined with a GNN model for the prediction of column indices of words in a table of an unstructured document. Further, embodiments of the disclosed GNN model may employ node and edge features.

Further, embodiments may employ an error function, for the GNN training, that combines L1 loss and a ColSortErr function. This error function may be used to train the GNN model, which leverages a priori knowledge about the structure of a table. In this example error function, words are sorted by their x coordinate and the sequences of column indices generated from which for the both the true and predicted column indices are compared.

As a final example, example embodiments may combine a two-pronged computer-vision model to detect table body and table header, a rule-based algorithm to assign a first guess of the sought column indices of the words in the table, and a GNN model that refines the first guess of the rule-based algorithm, generating the final prediction of column indices with the employed input features.

D. EXAMPLE METHODS

It is noted with respect to the example method of FIG. 12 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Figure 10:
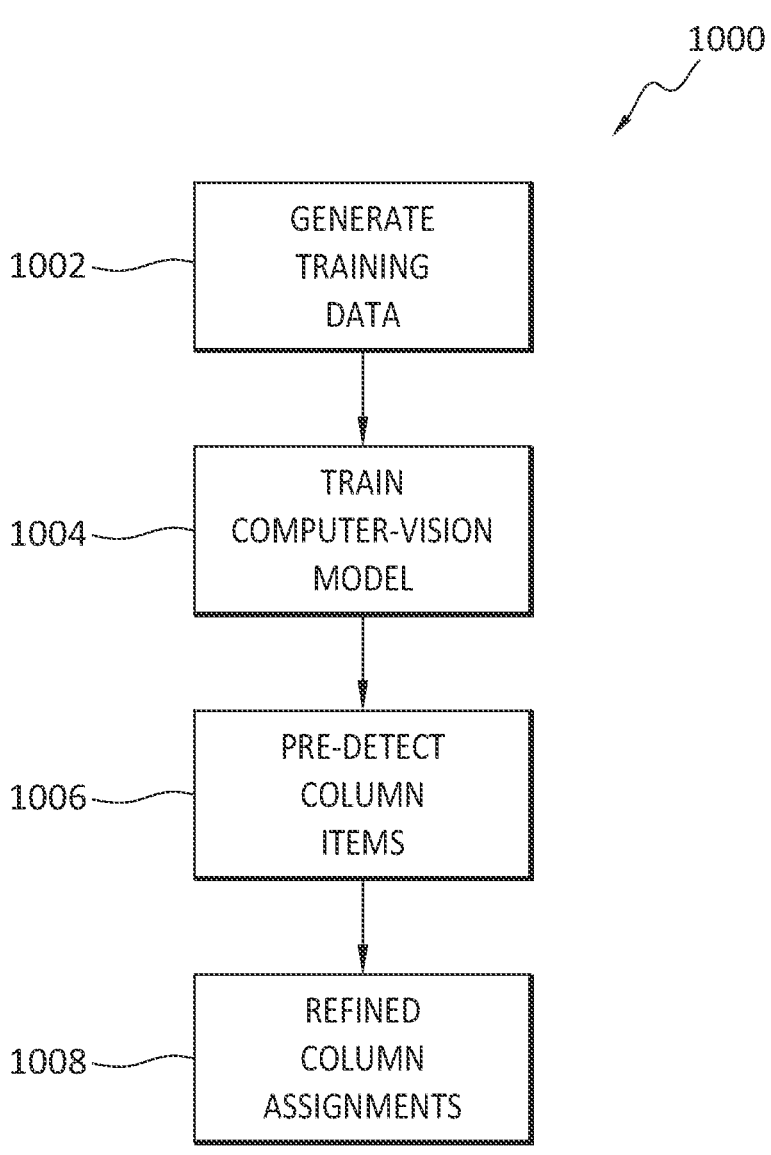
FIG. 10 discloses aspects of an example method for prediction of table column items according to some embodiments.

Directing attention now to FIG. 10, an example method 1000 for prediction of table column items in an unstructured document is disclosed. The method 1000 may be performed in whole or in part by an application that may be hosted on a server, and/or provided aaS (as a Service) to one or more subscribers. No particular hardware or software implementation of the method 1000 is required however.

Initially, the method 1000 may begin with generation 1002 of a training data set. The generation 1002 of the training data set may involve collecting and annotating data. The collected data may comprise, for example, unstructured documents that have been annotated by a human and/or by a machine. In some embodiments, the training data set may comprise ground truth data against which the results of the operations of one or more of the disclosed algorithms and models may be compared.

After the training data set has been generated, that training data set may be used to train 1004 a model, such as a computer vision model for example, to detect a table body, and table header boundaries, in an unstructured document. A rule-based algorithm may then be used to pre-detect 1006 column items, such as words, in one or more columns of a table.

Finally, the results obtained at 1006 may be further refined 1008. In at least some embodiments, the refinement 1008 may comprise using a GNN model to make final column assignments to one or more words of a table of an unstructured document. Once the column locations of the words are known, the words may be extracted and analyzed, or otherwise processed.

E. FURTHER EXAMPLE EMBODIMENTS

Following are some further example embodiments of the invention. These are presented only by way of example and are not intended to limit the scope of the invention in any way.

Embodiment 1. A method, comprising: collecting training data that comprises annotated unstructured documents that each include one or more tables with words whose respective column indices are known; training a model, using the training data, to detect a table body and a table header in a given document; identifying, by the model, a region of a document that corresponds to a table header of a table in a new document that is not part of the training data; using a rule-based algorithm to: perform a segmentation process on the table header that returns a list of column boundaries identified in the table header; and use the identified column boundaries to preliminarily assign a respective column index to each word in the table header; running a graph neural network model on a graph that includes the words in the table, and running the graph neural network generates a refined prediction of a respective column index for each of the words in the table of the new document.

Embodiment 2. The method as recited in embodiment 1, wherein the new document is an unstructured, unannotated, document.

Embodiment 3. The method as recited in any of embodiments 1-2, wherein the model is a computer vision model.

Embodiment 4. The method as recited in any of embodiments 1-3, wherein the graph includes a respective node for each word in the table, and each of the nodes is associated with a respective feature vector.

Embodiment 5. The method as recited in any of embodiments 1-4, further comprising training the graph neural network prior to running the graph neural network on the graph.

Embodiment 6. The method as recited in embodiment 5, wherein training the graph neural network comprises: performing a training process that comprises generating the graph, each of the words in the table corresponds to a node in the graph, and each node is associated with a respective feature vector; and performing an inference process to predict a column index for each word in the table.

Embodiment 7. The method as recited in any of embodiments 1-6, wherein the model identifies the region of the document by identifying one or more bounding boxes of the table header.

Embodiment 8. The method as recited in any of embodiments 1-7, further comprising using the refined prediction of a respective column index for each of the words in the table of the new document to extract one or more of the words from the document, and processing the extracted words.

Embodiment 9. The method as recited in any of embodiments 1-8, wherein training the model comprises using an error function to minimize an error between a column index value assigned by the model and a column index value in the training data.

Embodiment 10. The method as recited in embodiment 9, wherein the error function comprises a first error function and a second error function.

Embodiment 11. A hardware and/or software system operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

US 12,596,728 B2

G. EXAMPLE COMPUTING DEVICES AND
ASSOCIATED MEDIA

The embodiments disclosed herein may include the use of
a special purpose or general-purpose computer including
various computer hardware or software modules, as dis-
cussed in greater detail below. A computer may include a
processor and computer storage media carrying instructions
that, when executed by the processor and/or caused to be
executed by the processor, perform any one or more of the
methods disclosed herein, or any part(s) of any method
disclosed.

As indicated above, embodiments within the scope of the
present invention also include computer storage media,
which are physical media for carrying or having computer-
executable instructions or data structures stored thereon.
Such computer storage media may be any available physical
media that may be accessed by a general purpose or special
purpose computer.

By way of example, and not limitation, such computer
storage media may comprise hardware storage such as solid
state disk/device (SSD), RAM, ROM, EEPROM, CD-ROM,
flash memory, phase-change memory ("PCM"), or other
optical disk storage, magnetic disk storage or other magnetic
storage devices, or any other hardware storage devices
which may be used to store program code in the form of
computer-executable instructions or data structures, which
may be accessed and executed by a general-purpose or
special-purpose computer system to implement the dis-
closed functionality of the invention. Combinations of the
above should also be included within the scope of computer
storage media. Such media are also examples of non-
transitory storage media, and non-transitory storage media
also embraces cloud-based storage systems and structures,
although the scope of the invention is not limited to these
examples of non-transitory storage media.

Computer-executable instructions comprise, for example,
instructions and data which, when executed, cause a general
purpose computer, special purpose computer, or special
purpose processing device to perform a certain function or
group of functions. As such, some embodiments of the
invention may be downloadable to one or more systems or
devices, for example, from a website, mesh topology, or
other source. As well, the scope of the invention embraces
any hardware system or device that comprises an instance of
an application that comprises the disclosed executable
instructions.

Although the subject matter has been described in lan-
guage specific to structural features and/or methodological
acts, it is to be understood that the subject matter defined in
the appended claims is not necessarily limited to the specific
features or acts described above. Rather, the specific features
and acts disclosed herein are disclosed as example forms of
implementing the claims.

As used herein, the term 'module' or 'component' may
refer to software objects or routines that execute on the
computing system. The different components, modules,
engines, and services described herein may be implemented
as objects or processes that execute on the computing
system, for example, as separate threads. While the system
and methods described herein may be implemented in
software, implementations in hardware or a combination of
software and hardware are also possible and contemplated.
In the present disclosure, a 'computing entity' may be any
computing system as previously defined herein, or any
module or combination of modules running on a computing
system.

In at least some instances, a hardware processor is pro-
vided that is operable to carry out executable instructions for
performing a method or process, such as the methods and
processes disclosed herein. The hardware processor may or
may not comprise an element of other hardware, such as the
computing devices and systems disclosed herein.

In terms of computing environments, embodiments of the
invention may be performed in client-server environments,
whether network or local environments, or in any other
suitable environment. Suitable operating environments for at
least some embodiments of the invention include cloud
computing environments where one or more of a client,
server, or other machine may reside and operate in a cloud
environment.

Figure 11:
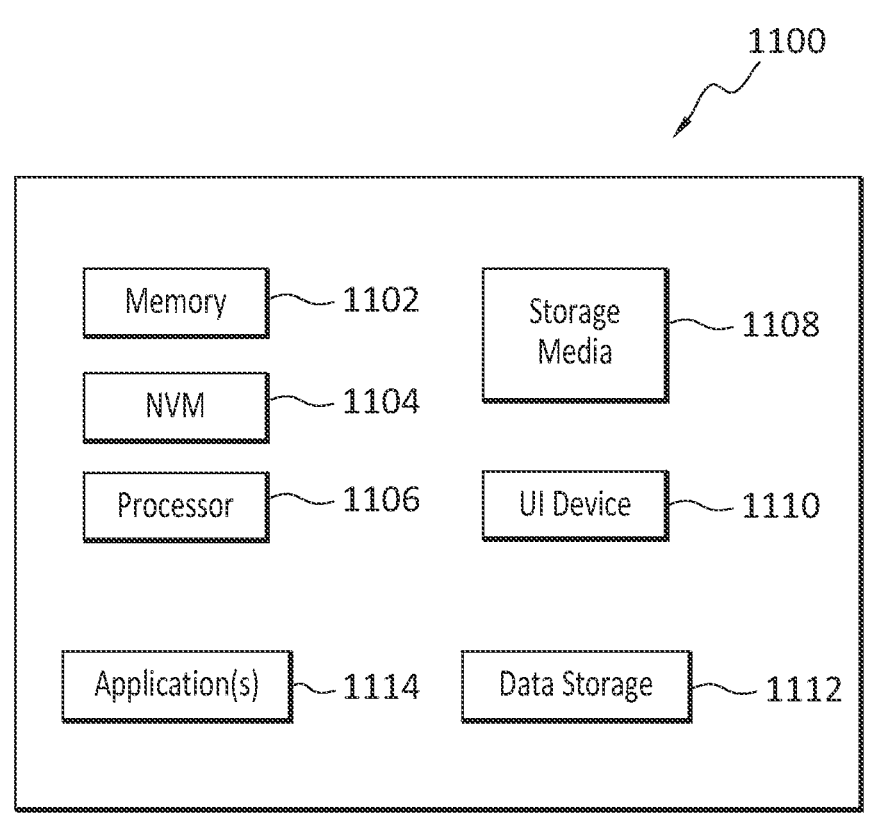
FIG. 11 discloses aspects of an example physical computing entity operable to perform any of the claimed methods, processes, and operations.

With reference briefly now to FIG. 11, any one or more of
the entities disclosed, or implied, by FIGS. 1-10 and/or
elsewhere herein, may take the form of, or include, or be
implemented on, or hosted by, a physical computing device,
one example of which is denoted at 1100. As well, where any
of the aforementioned elements comprise or consist of a
virtual machine (VM), that VM may constitute a virtualiza-
tion of any combination of the physical components dis-
closed in FIG. 11.

In the example of FIG. 11, the physical computing device
1100 includes a memory 1102 which may include one, some,
or all, of random access memory (RAM), non-volatile
memory (NVM) 1104 such as NVRAM for example, read-
only memory (ROM), and persistent memory, one or more
hardware processors 1106, non-transitory storage media
1108, UI device 1110, and data storage 1112. One or more
of the memory components 1102 of the physical computing
device 1100 may take the form of solid state device (SSD)
storage. As well, one or more applications 1114 may be
provided that comprise instructions executable by one or
more hardware processors 1106 to perform any of the
operations, or portions thereof, disclosed herein.

Such executable instructions may take various forms
including, for example, instructions executable to perform
any method or portion thereof disclosed herein, and/or
executable by/at any of a storage site, whether on-premises
at an enterprise, or a cloud computing site, client, datacenter,
data protection site including a cloud storage site, or backup
server, to perform any of the functions disclosed herein. As
well, such instructions may be executable to perform any of
the other operations and methods, and any portions thereof,
disclosed herein.

The present invention may be embodied in other specific
forms without departing from its spirit or essential charac-
teristics. The described embodiments are to be considered in
all respects only as illustrative and not restrictive. The scope
of the invention is, therefore, indicated by the appended
claims rather than by the foregoing description. All changes
which come within the meaning and range of equivalency of
the claims are to be embraced within their scope.

What is claimed is:
1. A method, comprising:
collecting training data that comprises annotated unstruc-
tured documents that each include one or more tables
with words whose respective column indices are
known;
training a model, using the training data, to detect a table
body and a table header in a given document;
identifying, by the model, a region of a document that
corresponds to a table header of a table in a new
document that is not part of the training data;

using a rule-based algorithm to:

perform a segmentation process on the table header that returns a list of column boundaries identified in the table header; and use the identified column boundaries to preliminarily assign a respective column index to each word in the table header; and running a graph neural network model on a graph that includes nodes based on the words in the table and edges based on the identified column boundaries, wherein running the graph neural network generates a refined prediction of a respective column index for each of the words in the table of the new document.

2. The method as recited in claim 1, wherein the new document is an unstructured, unannotated, document.

3. The method as recited in claim 1, wherein the model is a computer vision model.

4. The method as recited in claim 1, wherein the graph includes a respective node for each word in the table, and each of the nodes is associated with a respective feature vector.

5. The method as recited in claim 1, further comprising training the graph neural network prior to running the graph neural network on the graph.

6. The method as recited in claim 5, wherein training the graph neural network comprises:

performing a training process that comprises generating the graph, each of the words in the table corresponds to a node in the graph, and each node is associated with a respective feature vector; and performing an inference process to predict a column index for each word in the table.

7. The method as recited in claim 1, wherein the model identifies the region of the document by identifying one or more bounding boxes of the table header.

8. The method as recited in claim 1, further comprising using the refined prediction of a respective column index for each of the words in the table of the new document to extract one or more of the words from the document, and processing the extracted words.

9. The method as recited in claim 1, wherein training the model comprises using an error function to minimize an error between a column index value assigned by the model and a column index value in the training data.

10. The method as recited in claim 9, wherein the error function comprises a first error function and a second error function.

11. A non-transitory storage medium having stored therein instructions that are executable by one or more hardware processors to perform operations comprising:

collecting training data that comprises annotated unstructured documents that each include one or more tables with words whose respective column indices are known;

training a model, using the training data, to detect a table body and a table header in a given document;

identifying, by the model, a region of a document that corresponds to a table header of a table in a new document that is not part of the training data;

using a rule-based algorithm to:

perform a segmentation process on the table header that returns a list of column boundaries identified in the table header; and use the identified column boundaries to preliminarily assign a respective column index to each word in the table header; and running a graph neural network model on a graph that includes nodes based on the words in the table and edges based on the identified column boundaries, wherein running the graph neural network generates a refined prediction of a respective column index for each of the words in the table of the new document.

12. The non-transitory storage medium as recited in claim 11, wherein the new document is an unstructured, unannotated, document.

13. The non-transitory storage medium as recited in claim 11, wherein the model is a computer vision model.

14. The non-transitory storage medium as recited in claim 11, wherein the graph includes a respective node for each word in the table, and each of the nodes is associated with a respective feature vector.

15. The non-transitory storage medium as recited in claim 11, further comprising training the graph neural network prior to running the graph neural network on the graph.

16. The non-transitory storage medium as recited in claim 15, wherein training the graph neural network comprises:

performing a training process that comprises generating the graph, each of the words in the table corresponds to a node in the graph, and each node is associated with a respective feature vector; and performing an inference process to predict a column index for each word in the table.

17. The non-transitory storage medium as recited in claim 11, wherein the model identifies the region of the document by identifying one or more bounding boxes of the table header.

18. The non-transitory storage medium as recited in claim 11, further comprising using the refined prediction of a respective column index for each of the words in the table of the new document to extract one or more of the words from the document, and processing the extracted words.

19. The non-transitory storage medium as recited in claim 11, wherein training the model comprises using an error function to minimize an error between a column index value assigned by the model and a column index value in the training data.

20. The non-transitory storage medium as recited in claim 19, wherein the error function comprises a first error function and a second error function.

\* \* \* \* \*